United States Patent [19]

Pilatowicz et al.

[11] Patent Number: 4,932,126

[45] Date of Patent: Jun. 12, 1990

[54] HAND HELD TRIMMER FOR CUTTING VEGETATION SUCH AS HEDGES AND THE LIKE

[75] Inventors: Edward J. Pilatowicz, Woodland Hills; Anthony Carsello, Chino; Richard Landy, Jr., Saugus, all of Calif.

[73] Assignee: Allegretti & Company, Chatsworth, Calif.

[21] Appl. No.: 236,860

[22] Filed: Aug. 26, 1988

Related U.S. Application Data

[63] Continuation-in-part of Ser. No. 121,617, Nov. 17, 1987.

[51] Int. Cl.$^5$ .............................................. B26B 19/02
[52] U.S. Cl. ...................................... 30/216; 30/277.4
[58] Field of Search ................. 30/272 A, 272 R, 216, 30/210, 241, 272.1, 277.4; 464/86, 87, 97

[56] References Cited

U.S. PATENT DOCUMENTS

| | | | |
|---|---|---|---|
| D. 207,505 | 4/1967 | Whitmen . | |
| 1,937,586 | 12/1933 | Ortt | 30/11 |
| 2,268,221 | 12/1941 | Mischker | 30/228 |
| 2,537,122 | 1/1951 | Desmond | 64/29 |
| 2,564,032 | 8/1951 | Robertson | 30/216 |
| 2,633,636 | 4/1953 | Szostek | 30/216 |
| 3,347,062 | 10/1967 | Schumann | 64/28 |
| 3,429,639 | 2/1969 | Peters | 350/289 |
| 3,431,647 | 3/1969 | Scott | 30/216 X |
| 3,552,015 | 1/1971 | Batson | 30/216 |
| 4,185,381 | 1/1980 | Palmieri et al. | 30/347 |
| 4,281,504 | 8/1981 | Moore | 56/103 |
| 4,282,652 | 8/1981 | Balles, Sr. | 30/276 |
| 4,747,796 | 3/1988 | Iwai et al. | 464/97 X |

Primary Examiner—Douglas D. Watts
Attorney, Agent, or Firm—Lyon & Lyon

[57] ABSTRACT

A hand held trimmer for cutting heavy vegetation such as hedges or the like is disclosed. The trimmer includes a handle having a centrally disposed hand grip thereon. The handle includes mounting means for a conventional cutting means at one end and a convention motor at the other. The trimmer cutting means and trimmer motor are preferably disposed at substantially opposite ends of the handle such that the weight of one substantially counterbalances the weight of the other. A resilient drive shaft means is disposed within the handle and extends between the motor to the reciprocating blade drive means so as to substantially avoid damaging the motor and the drive means should the trimmer reciprocating blades become temporarily jammed during operation. The handle preferably includes a first grip centrally disposed between the cutting means and the trimmer motor and a second hand grip position on the cutting means end of the handle such that the trimmer may be actuated using one hand on said centrally disposed grip or two hands on said handles, so as to permit the operator to comfortably trim along a substantially horizontal, vertical, inclined or curvilinear surface.

5 Claims, 2 Drawing Sheets

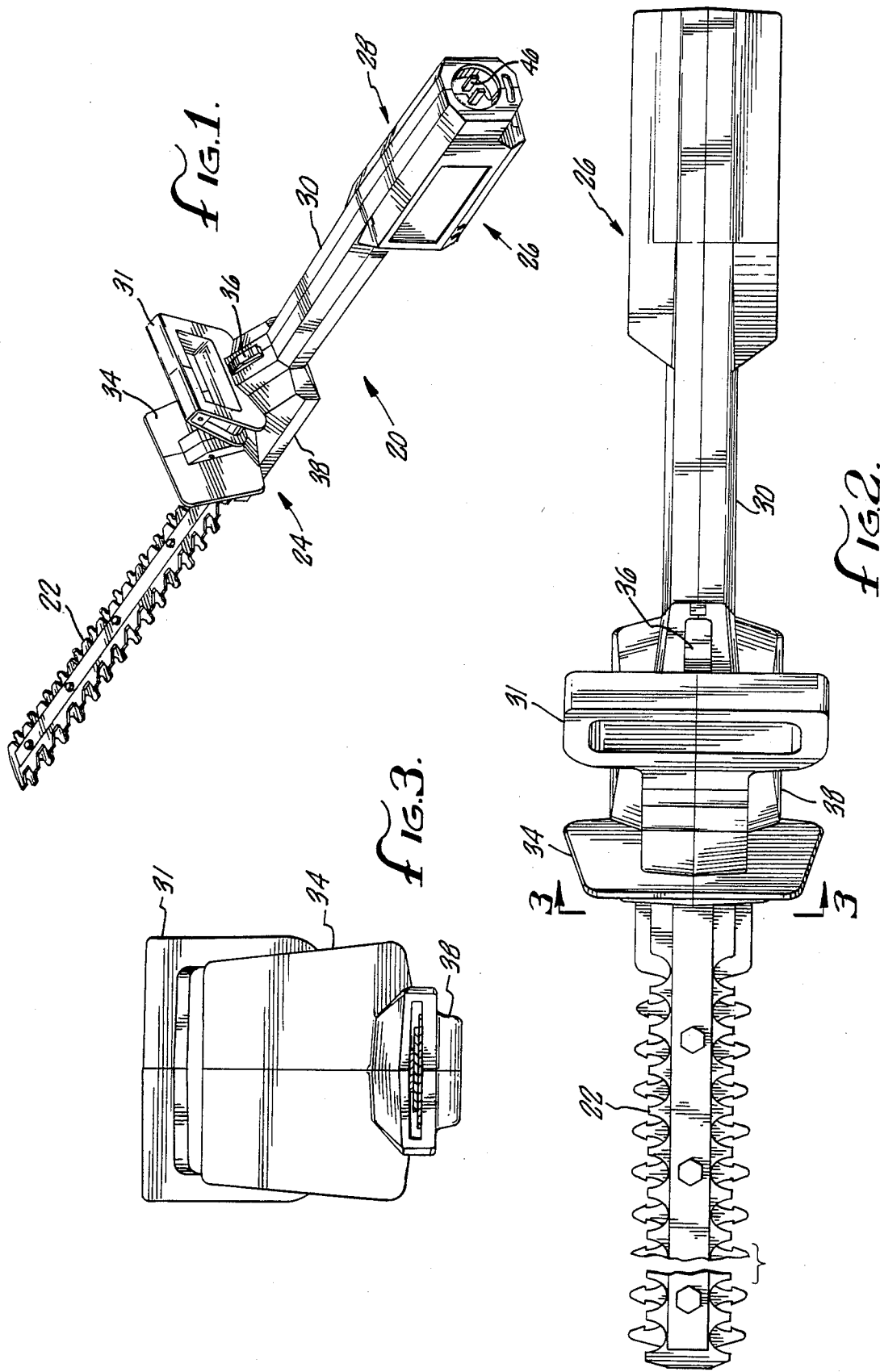

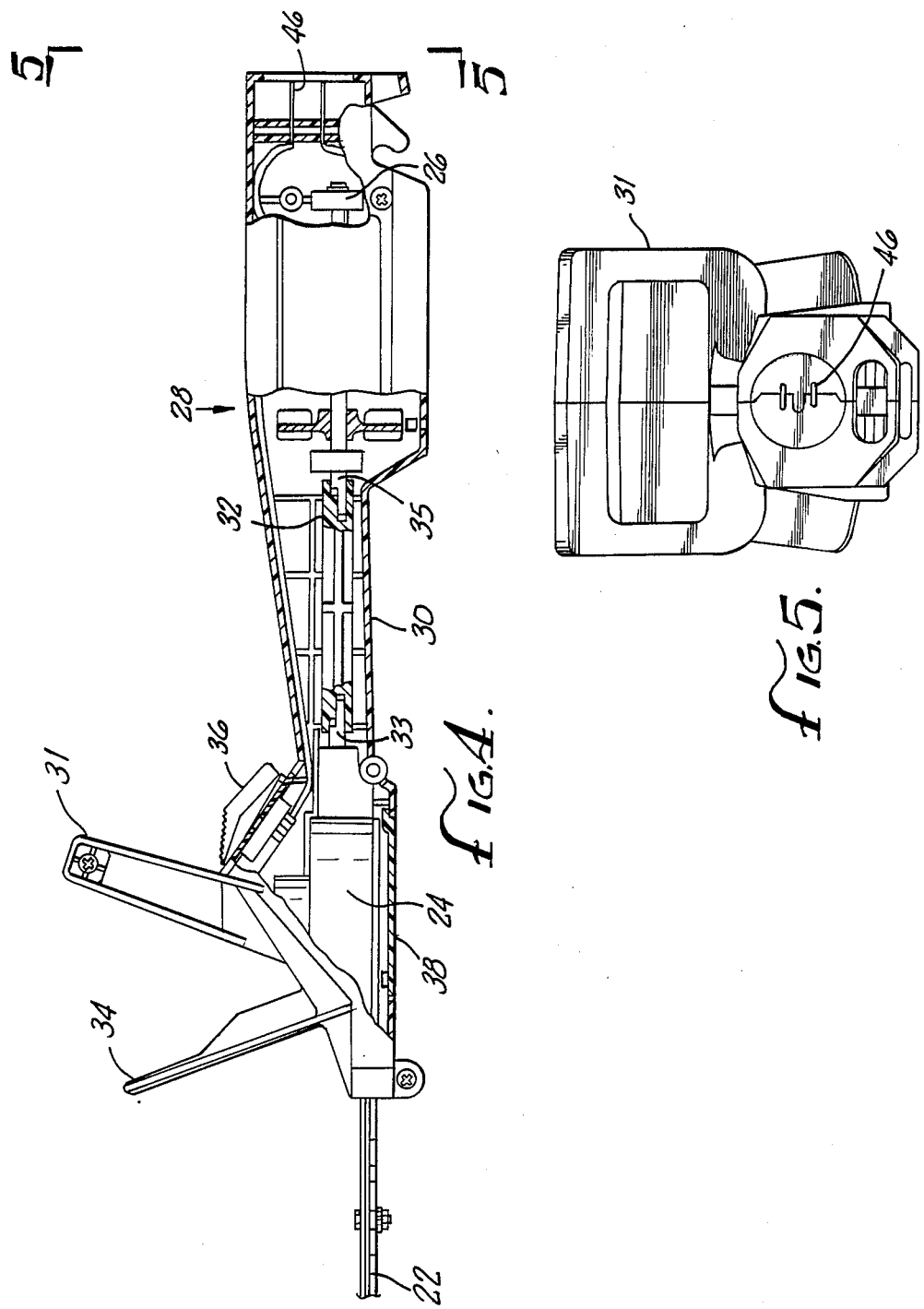

HAND HELD TRIMMER FOR CUTTING VEGETATION SUCH AS HEDGES AND THE LIKE

RELATED APPLICATIONS

This application is a continuation-in-part application of application Ser. No. 121,617 filed on Nov. 17, 1987.

BACKGROUND OF THE INVENTION

The present invention relates to trimmers for trimming vegetation, and more particularly, to hand held trimmers for trimming vegetation such as hedges and the like.

Motorized trimmers for cutting heavy vegetation such as hedges and the like are widely recognized as being a great convenience to persons who trim such vegetation so as to provide the vegetation with an aesthetically pleasing appearance. Typically, these vegetation trimming devices include an engine or power source, which may be powered either electrically or through an internal combustion process, a handle apparatus and a cutting unit. Originally, such vegetation trimming devices included a one-sided reciprocating blade assembly and a drive mechanism or gear box which was in turn driven by the motor.

Presently, there is known in the art vegetation trimmers utilizing a two-sided reciprocating blade means. The two-sided blade means was an improvement to the user of these vegetation trimmers since it permitted the user to trim vegetation while guiding the cutting means in either direction across the surface of the vegetation. In addition, the interval between sharpening of the reciprocating blades can be increased if both sides of the two-sided reciprocating blade means are evenly used.

There are known in the art numerous commercially available vegetation trimmers having two-sided reciprocating cutting blades driven by an electric motor or an internal combustion engine. These vegetation trimmers typically have the cutting blade assembly and the motor positioned in close proximity to each other cantilevered off the forward end of the vegetation trimmer handle. This unbalanced arrangement requires the operator of the vegetation trimmer to support the cantilevered weight of both the motor and reciprocating blade assembly while using the trimmer, thus tiring the trimmer operator more quickly. Trimmers so arranged typically include a secondary handle so as to permit the operator to more comfortably use the trimming devices of the prior art. As such, these devices require the normal operator to hold the trimmer with both hands at all times in order to support this unbalanced configuration.

SUMMARY OF THE INVENTION

The present invention relates to a hand held trimmer for cutting heavy vegetation, such as hedges or the like, which includes a handle having a first, central grip disposed between a motor and the blade assembly to provide a balanced trimmer and a second, front grip disposed at the blade assembly end of the handle. The components of the present invention are arranged such that the weight of the motor tends to counterbalance the weight of the cutting blade assembly and drive mechanism since each of these components is preferably mounted on substantially opposite ends of the handle of the present invention. A resilient drive shaft extends from the motor to the drive for actuating a conventional two sided reciprocating blade assembly. So constructed, a trimmer according to the present invention provides a well-balanced hand held trimmer which may be held and comfortably operated with either the right or left hand, or both hands, of the operator in a variety of positions depending upon whether the trimming device is being used to trim along a horizontal path, a vertical path, an inclined path or a curvilinear path. Moreover, through the utilization of a resilient drive shaft, the trimmer of the present invention is provided with a means to substantially avoid damaging the drive mechanism and the motor should the cutting device become temporarily jammed during operation.

Thus, it is an object of the present invention to provide an improved hand held trimmer.

Another object of the present invention is to provide a hand held trimmer for cutting heavy vegetation, such as hedges or the like, which is well-balanced such that the weight of the various major components counterbalance each other.

It is a further object of the present invention to provide a hand held trimmer for cutting heavy vegetation such as hedges or the like to provide means which will avoid substantial damage to either the drive means or the motor means should the cutting means become temporarily jammed during operation.

It is a further object of the present invention to provide a hand held trimmer for cutting heavy vegetation which may be conveniently and comfortably used and operated while trimming a horizontal, vertical, inclined or curvilinear surface. Other and more detailed objects of the present invention will become apparent to those skilled in the art upon examination of the disclosure contained herein.

BRIEF DESCRIPTION OF DRAWINGS

FIG. 1 is a perspective view of a trimmer according to the present invention;

FIG. 2 is a top view illustrating a preferred embodiment of a trimmer according to the present invention;

FIG. 3 is a front view of a preferred embodiment of a trimmer according to the present invention taken along lines 3—3 of FIG. 2;

FIG. 4 is a side, partial cross-sectional view of a preferred embodiment of the handle of a trimmer according to the present invention shown; and FIG. 5 is a rear view of a preferred embodiment of the handle of a trimmer according to the present invention shown from substantially along lines 5—5 of FIG. 4.

DETAILED DESCRIPTION OF THE PREFERRED EMBODIMENT

As illustrated in FIG. 1, the trimmer of the present invention for trimming vegetation such as hedges or the like includes a double sided reciprocating cutting mechanism, a motor and a handle. Prior art trimmers have placed both the cutting mechanism and the motor in front of the handle, resulting in an unbalanced and awkward to handle trimmer. This has made it necessary to provide a secondary handle on these prior trimmers to permit the user of the trimmer to reasonably operate the device. As stated above, trimmers so configured include the disadvantage of virtually always requiring two hands to be used to hold the trimmer during use as well as requiring the user to support the weight of both the cutting mechanism and the motor which are disposed forward of the main handle means.

Turning in detail to FIGS. 1-5, it is seen that the preferred embodiment of a hand held vegetation trimmer 20 for cutting hedges and the like of the present invention also includes a double-sided reciprocating cutting blade assembly 22, a drive mechanism 24, a motor 26 and a handle 28. In the preferred embodiment of the present invention, the handle 28 includes a central hand grip 30 for use by the operator when handling the trimmer 20. As illustrated in the Figures, the first hand grip 30 is formed as the central portion of the handle 28. A front hand grip 31 is mounted on a forward portion 38 of the handle housing drive mechanism 24. The front hand grip 31 is centrally mounted atop the forward portion of the handle as shown in FIG. 2. This front hand grip 31 may be utilized for carrying the trimmer or for holding the trimmer during trimming operations. As shown, the handle 28 is further provided with a forward portion 38 arranged to accept the mounting of the cutting blade assembly 22 and its accompanying drive mechanism 24. Similarly, a rear handle portion 40 is arranged to accept the mounting of the motor 26.

The driver mechanism 24 of the trimmer 20 of the present invention is preferably of the type well known in the art and forms no part of the present invention. Similarly, the motor 26 of the present invention is preferably an electrical motor of conventional design but may also be an internal combustion engine or a motor of other known variety. In the preferred embodiment an electrical plug 46 is mounted in the rear of the handle 28. Since the motor and drive mechanism are located at opposite ends of the handle, it is necessary to connect the two components together. It is desirable, however, to provide a drive connection means which will substantially inhibit or prevent damage to either of these components should the reciprocating cutting blade assembly 22 become temporarily jammed during operation. Such could happen, for example, if the trimmer blades encounter a large branch or the like. Accordingly, the trimmer 20 of the present invention preferably includes a resilient drive shaft 32 connecting the motor 26 and the drive mechanism 24, which drive shaft is preferably disposed within grip 30. This drive shaft 32 is preferably constructed from a resilient material such as Nylon. Referring to FIG. 4, the resilient drive shaft 32 is connected at one end to drive mechanism shaft 33 and at its opposite end to motor shaft 35. During operation, should the cutting blade assembly 22 become jammed or engage an object which otherwise impacts a sudden shock to the trimmer 20, the shock is transmitted to the resilient drive shaft 32 which absorbs the shock without transmitting it to the motor. So arranged, the drive shaft 32 is able to absorb a sudden shock should the cutting blade assembly 22 become jammed on a branch or the like, thereby avoiding serious permanent damage to either the reciprocating cutter drive assembly 24 or the motor 26.

A guard shield 34 is also be provided between the front hand grip 31 and the rearward end of the cutting blade assembly 22 so as to prevent the operator's hands from inadvertently slipping off the hand grip 31 and into the cutting blades. Where the motor means 26 is an electrical motor, toggle switch 36 is preferably provided for turning the trimmer on and off. In a preferred embodiment of the invention, the guard shield 34 is formed as an integral part of handle 28.

When constructed in accordance with the teachings of the present invention, the weight of the motor 26 will act to offset the weight of the cutting means 22 and motor means 26 so as to provide the trimmer with an excellent longitudinal balance; that is, the trimmer is well balanced from front to back. In addition, the front hand grip in conjunction with the excellent balance of the present trimmer provides the operator with the option of operating the trimmer with one hand or two hands. Moreover, the disposition of the central hand grip in a balanced position between the motor and blade assembly provides the operator better control over the trimming device when the trimmer is used to cut along a horizontal, vertical, inclined or curvilinear surface since the operator may grasp and easily operate the trimmer either by the central hand grip 30 member, the front grip 31 member, or some combination of the two.

From the foregoing, it is seen that the hand operated trimmer of the present invention incorporates a simple, durable and easily manufactured structure having a balanced relationship between its various components while providing a plurality of grip members for increasing the ease with which trimming may be accomplished along a horizontal, vertical, inclined or curvilinear surface.

Although the invention has been described primarily with respect to one embodiment, it will be apparent to those skilled in the art that other embodiments of the present invention are possible. Thus, the scope of the present invention is limited only the scope of the appended claims.

We claim:

1. A hand held trimmer for cutting heavy vegetation such as hedges and the like, comprising:
   a handle, said handle including first and second hand grips;
   a cutting means, said cutting means being connected to said handle;
   a motor means, said motor means being connected to said handle, said motor means and said cutting means being arranged with respect to said handle so as to substantially counterbalance each other; and
   resilient drive means, said drive means extending between said motor means and said cutting means and being sufficiently resilient for driving said cutting means so as to substantially avoid damaging said motor means should said cutting means become jammed during operation,
   wherein said motor means and said cutting means are disposed at substantially opposite ends of said handle.

2. A trimmer as set forth in claim 1 wherein said first hand grip is disposed between said motor means and said cutting means.

3. A trimmer as set forth in claim 2 wherein said second hand grip is positioned at the cutting means end of the handle.

4. A trimmer as set forth in claim 3 wherein said resilient drive shaft means is disposed within said first hand grip.

5. A hand held trimmer for cutting heavy vegetation such as hedges and the like, comprising:
   a handle, said handle including first and second hand grips;
   a cutting means, said cutting means being connected to said handle;
   a motor means, said motor means being connected to said handle, said motor means and said cutting means being arranged with respect to said handle so as to substantially counterbalance each other;

resilient drive means, said drive means extending between said motor means and said cutting means and being sufficiently resilient for driving said cutting means so as to substantially avoid damaging said motor means should said cutting means become jammed during operation; and a shield guard longitudinally positioned between said second hand grip and said cutting means.

* * * * *